United States Patent [19]
Janotik

[11] Patent Number: 5,106,249
[45] Date of Patent: Apr. 21, 1992

[54] METHOD AND APPARATUS FOR JOINING PLASTIC PANELS TO ALUMINUM SPACE FRAMES

[75] Inventor: Adam M. Janotik, Grosse Ile, Mich.

[73] Assignee: Ford Motor Company, Dearborn, Mich.

[21] Appl. No.: 637,723

[22] Filed: Jan. 7, 1991

[51] Int. Cl.⁵ .............................................. F16B 13/04
[52] U.S. Cl. ...................................... 411/43; 411/45; 411/361; 403/388
[58] Field of Search .................... 411/43, 44, 41, 40, 411/546, 542, 361, 34, 39, 45; 403/388, 408.1

[56] References Cited

U.S. PATENT DOCUMENTS

| | | |
|---|---|---|
| 2,921,819 | 1/1960 | Rifkin ................................ 411/44 X |
| 3,483,788 | 12/1969 | Keeler . |
| 3,556,570 | 1/1971 | Cosenza . |
| 3,650,173 | 3/1972 | Mathe ................................. 411/45 |
| 4,043,239 | 8/1977 | DeFusco . |
| 4,579,473 | 4/1986 | Brugger ............................. 411/41 X |
| 4,707,020 | 11/1987 | Enokida et al. . |
| 4,786,225 | 11/1988 | Poe et al. . |
| 4,861,208 | 8/1989 | Boundy . |
| 4,868,968 | 9/1989 | Dixon et al. . |
| 4,912,826 | 4/1990 | Dixon et al. . |
| 4,943,196 | 7/1990 | Dahl . |

FOREIGN PATENT DOCUMENTS

| | | |
|---|---|---|
| 1955802 | 5/1971 | Fed. Rep. of Germany ........ 411/44 |
| 2216109 | 11/1972 | Fed. Rep. of Germany ........ 411/45 |
| 3304569 | 7/1984 | Fed. Rep. of Germany . |

Primary Examiner—Rodney M. Lindsey
Attorney, Agent, or Firm—Daniel M. Stock; Roger L. May

[57] ABSTRACT

A mounting assembly for fixing a panel to a space frame defining the general shape of an automotive vehicle that provides accurate, adjustable positioning of the panel with respect to the space frame and accommodates differential growth and shrinkage of the frame and the panel induced by temperature changes. The assembly includes a multi-piece fastener held axially and radially fast with respect to the space frame and axially and radially free with respect to the panel.

10 Claims, 2 Drawing Sheets

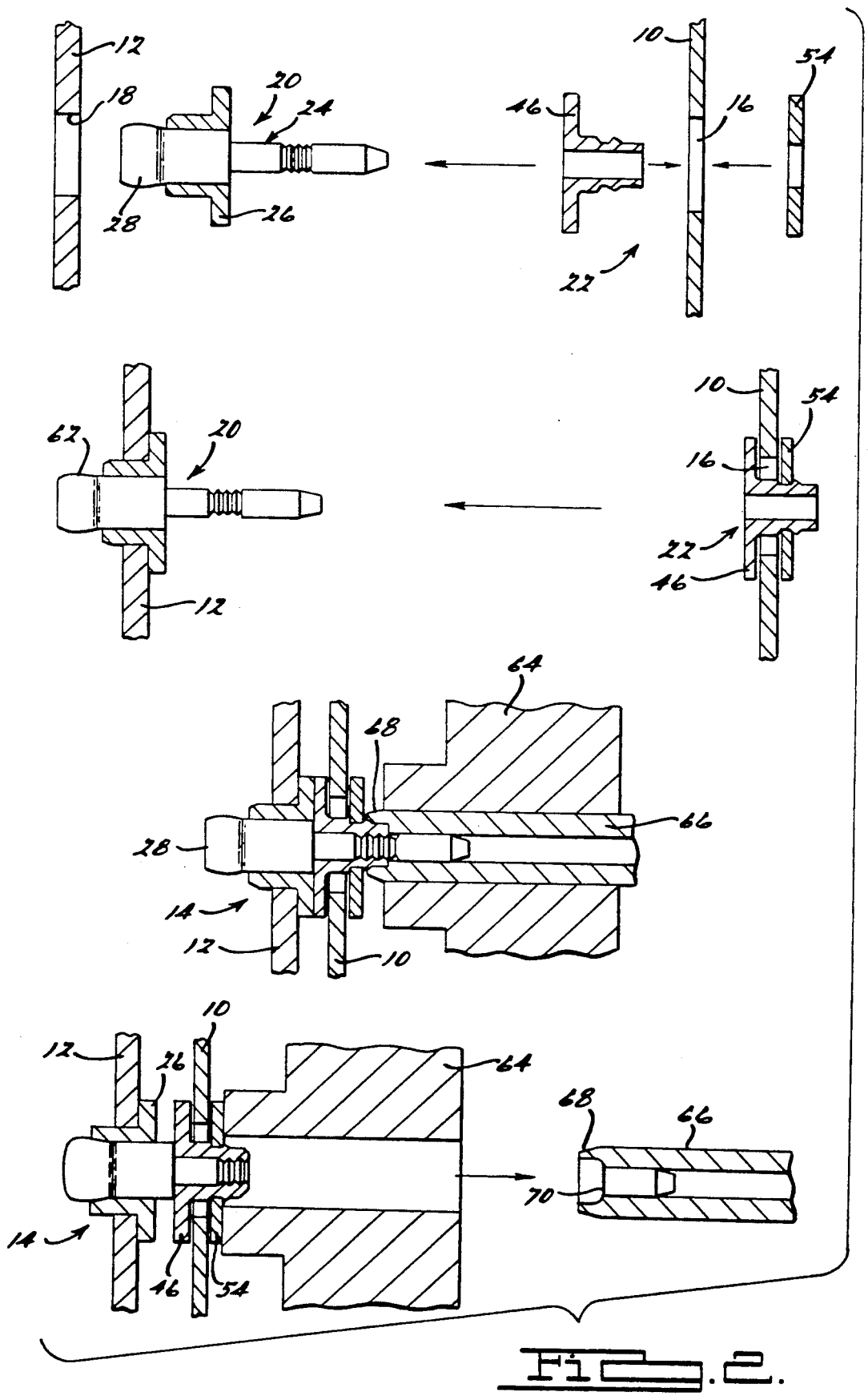

METHOD AND APPARATUS FOR JOINING PLASTIC PANELS TO ALUMINUM SPACE FRAMES

BACKGROUND OF THE INVENTION

1. Field of the Invention

The present invention relates generally to fasteners and more particularly to fasteners and fastening methods for joining panels of dissimilar materials to a fixed base.

The necessity to achieve optimal fuel economy in the production of automotive vehicles results in increased emphasis on ultralight vehicle construction. One promising lightweight body construction concept results in the use of lightweight metallic space frames, such as those formed from aluminum which serve as a skeleton to which lightweight external skins are attached as closure panels. This construction technique offers significant weight reduction potential, but it also brings problems which must be solved relating to the problems associated with joining the panels, which are often formed of plastic or other material having a higher coefficient of thermal expansion than the space frame, to the skeleton or space frame.

Because of the fact that space frames have rigid jointed geometry, they are difficult to build in close tolerances in three-dimensional space. As a result of this, means must be provided on the assembly line for a vehicle to align all external and internal surfaces and other closures in a way to produce acceptable body fits, margins about the plan view projection of the body panels and the flushness of adjacent panels. In current production technology, the desired flushness and other fits are achieved through methods such as those shown in U.S. Pat. No. 4,529,244 and U.S. Pat. No. 4,597,153 to Zaydel. Certain improvements in this technology have been disclosed in U.S. Pat. No. 4,868,968 and U.S. Pat. No. 4,912,826 assigned to the assignee of the present invention. These approaches, however, require significant investment in tooling and fixturing to achieve the desired body fit, making the approach impractical in all but the highest production vehicles.

One of the problems sought to be solved in the aforementioned production techniques is that of compensating for differences in coefficients of thermal expansion between adjacent panels, i.e., the underlying space frame and the plastic skin or decorative body panel which is laid over it. Means must be provided to allow certain movement between the space frame and the adjacent body panel to accommodate thermal induced growth and shrinkage.

While certain freedom of movement between adjacent panels is provided in the fasteners of the previously mentioned prior art, the automotive body art does not teach a method of joining decorative body panels to a space frame in a fashion which permits adjustable positioning, both with respect to movement for and away from the planar surface of the underlying subframe and parallel to the facing surface of such frame.

SUMMARY OF THE INVENTION

It is accordingly an object of the present invention to provide a method and apparatus for joining a panel to a space frame which provides for relative axial and radial adjustability of the position of the panel with respect of the space frame about an axis defined by a fastener passing therebetween and axially securing one to the other.

According to the invention, there is provided a fastener assembly which includes a stud subassembly lockingly secured in axially and radially fast relationship within a bore formed within the space frame and a grommet subassembly carried in axially and radially fast relationship with respect to the stud subassembly and received in the bore in radially free relationship and in limited axially free relationship with respect to the panel.

BRIEF DESCRIPTION OF THE DRAWINGS

These and other objects of the present invention will become apparent to those skilled in the automotive body fastener arts upon reading the following description with reference to the accompanying drawings in which:

FIG. 2 is a sequential assembly drawing illustrating how a panel is secured to a sub frame according to the present invention utilizing a fastener assembly according to the present invention.

DESCRIPTION OF THE PREFERRED EMBODIMENT

Figure 1:
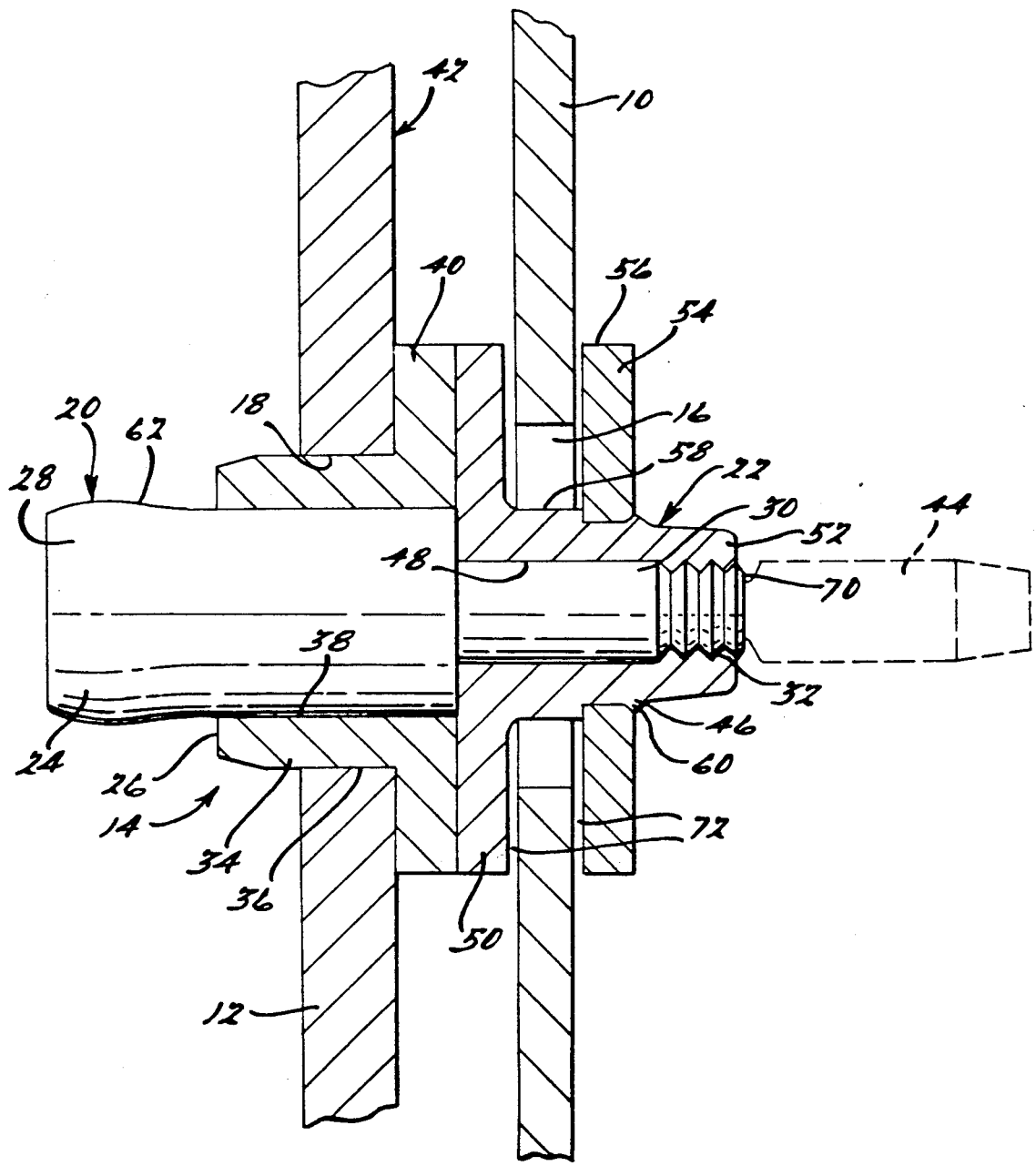
FIG. 1 is an assembled view in cross-section of a fastener assembly according to the present invention.

Turning now to the drawings and in particularly to FIG. 1 thereof, there is illustrated the mounting of a panel 10 with respect to a space frame 12 according to a fastener assembly indicated generally at 14, according to the present invention.

According to a preferred embodiment, the panel 10 is a plastic or composite panel forming a portion of an automotive vehicle. A bore 16 is formed through the panel. The bore 14 is preferably in axial registration with a bore 18 formed through the space frame 12 which is wrought by extrusion or other known processes for defining the general shape of an automotive vehicle.

The fastener subassembly 14 is formed of two subassemblies, a stud subassembly 20 and a grommet subassembly 22. The stud subassembly 20 consists of a pin 24 and a sleeve 26 for joining within aluminum subframe 12 the pin 24 is preferably fabricated of a cold formed steel and the sleeve 26 is preferably formed of aluminum. The pin 24 includes a large diameter portion 28 and a small diameter portion 30 having a plurality of serrations 32 formed at its outer end projecting toward the panel 10. The sleeve 26 is a hat-shaped member having a barrel portion 34 having an outer diameter 36 received within the bore 18 in axially fast relationship. This axial retention can be achieved through a press fit or through coaction with the pin 24 in a fashion to be later described. The sleeve 26 also includes an inner diameter 38 for receiving the large diameter portion 28 of the pin 24 and an annular flange portion 40 abuttingly engageable against an annular wall 42 of the space frame 12. Extending beyond the reduced diameter portion 30 of the pin 24 is a knock-off portion 44 utilized in this assembly.

The grommet subassembly 22 consists of a second sleeve 46 formed of hat-shaped configuration having a central bore 48 for receiving the reduced diameter portion 30 of pin 24, an annular flange portion 50 confronting the flange portion 40 of the first sleeve 26, and a barrel portion 52. A plate member 54 is received over the barrel portion 52 and has an outer diameter 56 extending beyond the bore 16 through the panel 10. The stud subassembly 20 and the grommet subassembly 22 are held in axially fast relationship with respect to each other but provide both radial freedom between the subframe 12 and the panel 10 by virtue of the radial clearance between the bore 16 and the outer diameter 58 of the grommet and by the axial spacing of the plate 54 and the flange 50 of the grommet subassembly 22 with respect to the panel 10.

The efficient assembly process by which this axial and radial freedom is secured may be appreciated by reference to FIG. 2 in which it is illustrated that the panel 10 and subframe 12 are prepared for joining by preassembly into each of the stud subassembly 20 and the grommet subassembly 22, respectively. The second sleeve 46 is inserted into the bore 16 and the plate 54 is slipped over the barrel portion 52 in snap-fit relationship over a protrusion 60 formed thereon to be loosely held, both axially and radially with respect to the panel 10.

The stud subassembly 20 is inserted into the bore 18. It may be held axially fast by press-fit with respect to the bore, but as is illustrated in FIG. 1, a tapered portion 62 may be utilized to deform a portion of the barrel 26 during insertion to secure it against axial movement.

The space frame 12 is then held in appropriate geometrical position by suitable fixtures and a framing fixture 64 engages the panel 10 and the grommet subassembly to move it toward the space frame 12. The framing fixture 64 includes a plunger 66 which includes a central crimping fixture 68 for engaging the outer end 68 of the sleeve 46, the framing fixture 64 is positioned at a predetermined location and the plunger 66 engages the sleeve and crimps it radially inwardly to form it into locking engagement with the serrations 32 of the pin 24.

When the framing fixture 64 is in its appropriate position, the plunger 66 and the framing fixture are removed, removing the knock-off portion 44 of the pin 24 by agency of its shear section 70 to fix the panel 10 with respect to the subframe 12 in the position shown in FIG. 1 in an accurate manner, movement of the panel 10 toward and away from the subframe being limited to that provided by the clearing indicated at 72.

While other assemblies and processes will become apparent to those skilled in the automotive assembly arts upon reading this description with reference to the accompanying drawings, what is claimed is:

1. A mounting assembly for assembling a metallic space frame defining the general shape of an automotive vehicle to a non-metallic covering panel having an inner and an outer side defining a certain thickness, the mounting assembly comprising:

means defining a first bore through the space frame;

means defining a second bore through the panel substantially aligned with the first bore and having a substantially larger diameter; and a fastener assembly including:

a stud subassembly lockingly secured in axially and radially fast relationship with respect to the space frame within the first bore; and a grommet subassembly carried in axially and radially fast relationship with the stud subassembly and received in the second bore in radially free relationship and having annular portions spaced from the panel inner and outer sides to permit relative axial movement of the panel with respect of the space frame.

2. A mounting assembly as defined in claim 1 wherein the space frame is aluminum and the panel is a plastic having a higher coefficient of thermal expansion than the aluminum space frame.

3. A mounting assembly as defined in claim 1 wherein the stud subassembly comprises a hat-shaped sleeve having a barrel portion received in the first bore and having an annular flange portion abuttingly engaged with the side of the space frame facing the panel.

4. A mounting assembly as defined in claim 3 wherein the barrel portion is received in press fit relationship in the first bore.

5. A mounting assembly as defined in claim 3 wherein the barrel portion is adhesively secured within the first bore.

6. A mounting assembly as defined in claim 3 wherein the stud assembly comprises a pin carried in axially fixed relationship with respect of the sleeve.

7. A mounting assembly as defined in claim 6 wherein the sleeve has a central through bore formed therethrough and said pin has a large diameter tapered portion adapted to be axially locked with respect to the sleeve upon insertion of the pin toward said panel in wedging relationship with respect to said through bore.

8. A mounting assembly as defined in claim 3 wherein the grommet subassembly comprises a second sleeve having a barrel portion received in radially loose relationship within the second bore and a annular flange portion positioned in confronting relationship with respect to the side of the panel facing the space frame and a plate axially spaced from the space portion a distance greater than the thickness of the panel in axially fixed with respect to the second sleeve.

9. A mounting assembly as defined in claim 3 wherein the space frame and the first sleeve are formed of aluminum and the pin is formed of steel.

10. A mounting assembly as defined in claim 8 wherein the second sleeve and the plate are formed of steel.

* * * * *